United States Patent
Naim et al.

(10) Patent No.: US 9,565,231 B1
(45) Date of Patent: Feb. 7, 2017

(54) SYSTEM AND METHODS FOR PROVIDING MULTIPLE VOICE OVER IP SERVICE MODES TO A WIRELESS DEVICE IN A WIRELESS NETWORK

(71) Applicant: Sprint Spectrum LP, Overland Park, KS (US)

(72) Inventors: Muhammad Ahsan Naim, Sterling, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 102 days.

(21) Appl. No.: 14/538,280

(22) Filed: Nov. 11, 2014

(51) Int. Cl.
*H04L 12/859* (2013.01)
*H04L 29/06* (2006.01)
*H04L 1/00* (2006.01)
*H04L 12/725* (2013.01)

(52) U.S. Cl.
CPC ............. *H04L 65/80* (2013.01); *H04L 1/0017* (2013.01); *H04L 45/306* (2013.01)

(58) Field of Classification Search
CPC ....... H04L 65/80; H04L 1/0017; H04L 45/306
See application file for complete search history.

(56) References Cited

U.S. PATENT DOCUMENTS

| | | | |
|---|---|---|---|
| 6,504,910 B1 | 1/2003 | Engelke et al. | |
| 2002/0190800 A1* | 12/2002 | Rosen | H03B 25/00 331/78 |
| 2005/0147049 A1* | 7/2005 | Ganesan | H04M 1/2535 370/241 |
| 2007/0083367 A1 | 4/2007 | Baudino et al. | |
| 2007/0274296 A1* | 11/2007 | Cross, Jr. | G10L 15/222 370/356 |
| 2008/0037804 A1* | 2/2008 | Shmunk | H04R 3/04 381/96 |
| 2009/0022103 A1* | 1/2009 | Shatsky | H04W 36/0022 370/331 |
| 2010/0255845 A1* | 10/2010 | Kitaji | H04W 36/30 455/436 |

* cited by examiner

Primary Examiner — Omar Ghowrwal (57) ABSTRACT

Systems and methods are described for providing multiple voice service modes to a wireless device using data packet transmission through a wireless network. Application requirements including a signal level threshold for a wireless device may be determined. Signal level information for the wireless device may be received and transmitted among various network nodes. The received signal level may be compared with the signal level threshold for the wireless device. The wireless device and the access node may communicate wirelessly to provide voice services to the wireless device application. Data transmission may be converted between a first mode and a second mode depending upon a relative position of the received signal level with respect to the signal level threshold. The second mode of data transmission may be used where the first mode of data transmission cannot because the second mode may consume less network resources.

20 Claims, 6 Drawing Sheets

SYSTEM AND METHODS FOR PROVIDING MULTIPLE VOICE OVER IP SERVICE MODES TO A WIRELESS DEVICE IN A WIRELESS NETWORK

TECHNICAL BACKGROUND

Voice over Internet Protocol (VoIP) and Voice over Long Term Evolution (VoLTE) are methodologies for delivering data packets containing digital information representing an audio signal generated by a user of a wireless device during a voice call. The wireless device may be capable of wireless communication with one or more access nodes in a wireless network which is in further communication with a network such as the internet. In order to use VoIP or VoLTE, the wireless device must be near enough to an access node of the wireless network in order to initiate and maintain the wireless communication for transmission of data packets to and from the access node and thereby through the network. In various circumstances, a wireless device may begin a voice call in a weak signal area or it may begin the voice call in a strong signal area and subsequently move into a weaker area.

When a received signal level for a serving access node drops below a minimum threshold at a wireless device, call service may be degraded due to dropped packets intended for that device, and eventually a voice session may be terminated if packets continue to drop. However, when a received signal level is too low for voice service, it may still be sufficient for other data services, such as email, web browsing, or text. Data services may be measured by various metrics such as an average data rate. Applications that require smaller data rates may consume less network resources than those with larger data rates, which may lead to fewer dropped packets.

OVERVIEW

Systems and methods are described for providing multiple modes of VoIP or VoLTE services in a wireless network. A wireless device may initiate persistent communication with an access node that is connected to a network. The access node may determine application requirements for the wireless device, including a signal level threshold for the persistent communication. At some point during the voice call, it may be determined that an instantaneous received signal level for signals transmitted between the wireless device and the access node is below a signal level threshold.

When the instantaneous received signal level is determined to be below the signal level threshold, data packets between the wireless device and the access node may be converted from a first mode of data transmission to a second mode of data transmission. If received signal levels change position relative to the signal level threshold during the voice call, then data packet transmission may be converted back to the first mode of data transmission, continuing to convert as appropriate based on received signal levels. The second data mode of data transmission may require less network resources than the first mode of data transmission, which may be measured as a total number of data packets or an average or peak data rate for transmission.

DETAILED DESCRIPTION

Figure 1:
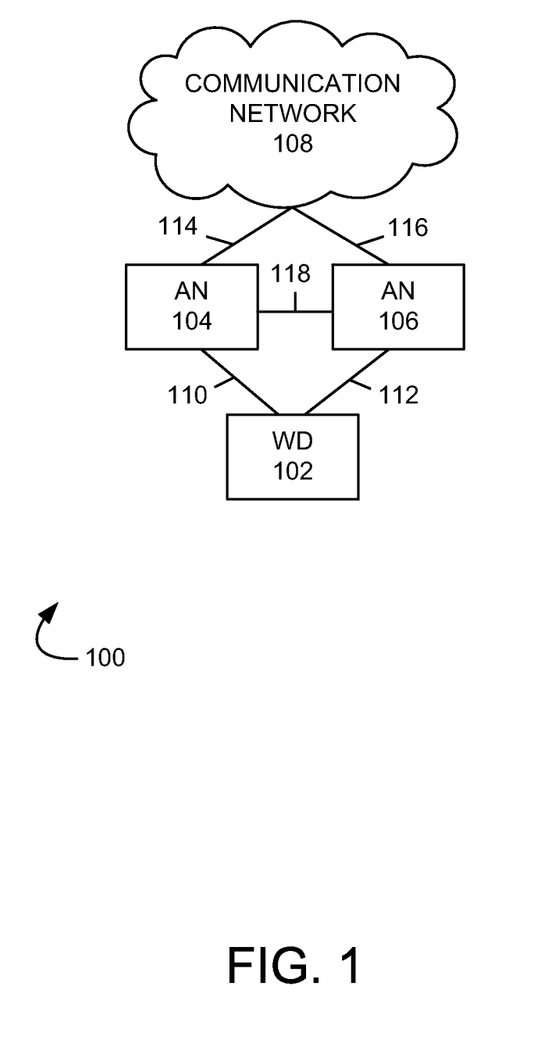
FIG. 1 illustrates an exemplary communication system used to provide multiple VoIP service modes to a wireless device in a wireless network.

FIG. 1 illustrates an exemplary communication system 100 that may be used to provide multiple VoIP service modes to a wireless device in a wireless network, the system comprising wireless device 102, access nodes 104 and 106, communication network 108, and communication links 110, 112, 114, and 116. Each of the access nodes may have a plurality of cells in one or more frequency bands. The cells of access node 104 may be associated with a different frequency band than the cells of access node 106.

Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and may be, for example, a base transceiver station, a radio base station, a NodeB device, or an eNodeB device. Access nodes 104 and 106 may communicate with communication network 108 over communication links 114 and 116. Access nodes 104 and 106 may also communicate directly with each other over communication link 118. In an embodiment, access node 104 may comprise a serving access node for wireless device 102.

Although only two access nodes 104 and 106 are illustrated in FIG. 1, wireless device 102 can be in communication with additional access nodes. The plurality of access nodes may be associated with different networks and may support different communication protocols and radio access technologies.

Communication network 108 may comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (Wi-MAX™).

Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or other types of communication equipment, as well as combinations thereof.

Communication links 110, 112, 114, 116, and 118 may be wired or wireless communication links. Wired communication links may comprise, for example, twisted pair cable, coaxial cable, or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, WiMAX™, or 3GPP LTE, or combinations thereof. Other wireless protocols can also be used.

Wireless device 102 may receive signal levels from the one or more access nodes 104 and 106 in order to establish wireless communication with at least one access node. Wireless device 102 may select a serving access node, which for example may be access node 104. Signal measurement reports between wireless device 102 and serving access 104 may be monitored for signal levels in a near continuous manner, or at periodic intervals, having discontinuous timing suited to network conditions or anticipated signal levels in a particular geographic area. Furthermore, timing of signal measurements may be related to network conditions or events such as access node density or deployment.

In various wireless networks including exemplary embodiments such as 3G and 4G LTE, an instantaneous data rate for voice applications in a "talk" period may be in a range of ~150-400 kbps. Over time, an average data rate for voice applications with "silence" periods and data header compression may be in a range of ~8-20 kbps. However, other data packets such as those containing text may consume far less network resources and may not have application requirements including a guaranteed bit rate (GBR) or the same frequency of persistent scheduling as data packets containing voice.

A wireless device that determines a received signal level for its serving access node to be below a signal level threshold for VoIP or VoLTE may still be able to communicate with the serving access node using a different mode of data transmission. For example, the wireless device may be able to send text messages, as the text within the data packets may be transmitted with less use of network resources. In an exemplary embodiment, it may be possible to communicate between the serving access node and the wireless devices using a small fraction of the data rates required for voice.

In a particular example, a received signal level may still support data transmission on the order of 1-2 kbps. While merely exemplary, this data rate may be sufficient to support transmission of text data packets, as noted above. Thus, in order to initiate or maintain a voice call for the wireless device when the received signal level is below a signal level threshold, data packets containing voice may be converted to text data packets prior to transmission. Depending upon whether the wireless device is sending or receiving data packets, the conversion may take place at the wireless device itself or at the serving access node.

In a non-transparent embodiment of the presently disclosed subject matter, a user of a wireless device may manually activate a desired mode of VoIP or VoLTE service, for example when the user is undergoing high mobility conditions, is inside a building, or for any other reason anticipates degraded signal level conditions. In a transparent embodiment of the presently disclosed subject matter, selection of a mode of VoIP or VoLTE service may be performed by a network node, such as the serving access node or another access node on the side of the intended receiver.

A controller node may instruct each of the access nodes regarding the current mode so they may prepare appropriate resources to transmit and/or convert data at a rate corresponding to the instructed mode of data transmission. Each access node may be configured to convert from voice-to-text or text-to-voice, depending on which side of the call is experiencing degraded signal level conditions. Wireless devices themselves may also be capable of converting from voice-to-text, then transmitting text data packets to the serving access node. A receiver wireless device may also be capable of converting from text-to-voice prior to audio playback.

Wireless device 102 may be able to detect the signals from access nodes 104 and 106 when wireless device 102 is within signal radii of both access nodes. When wireless device 102 detects a signal from access node 104 and it is determined that the signal from access node 104 meets a threshold signal level, wireless device 102 may attempt to establish communication with access node 104. For example, the signal level may be represented by received signal level indication (RSSI), system information signal received power (RSRP), reference signal received quality (RSRQ), signal to interference plus noise ratio (SINR), or any other suitable metric.

In an embodiment, when the system information signal from access node 104 meets a threshold system information signal level, wireless device 102 may attempt to establish a wireless connection with access node 104. In an embodiment, access nodes 104 and 106 may be identified by any wireless device in range of both access nodes, such as wireless device 102.

The access nodes may be identified by information such as physical cell identifiers (PCI), cell global identifications (CGI), E-UTRAN cell identifiers (ECI), E-UTRAN cell global identifiers (ECGI), eNodeB identifiers (eNB-ID), or the like. The wireless device may determine the signal levels for identified access nodes, as well as the frequency band of each cell of the access nodes. Access nodes may also provide connection information (e.g., X2 connection information), handover information, and other relevant neighbor information to determine network characteristics of nearby cells, including the frequency bands associated with each cell.

Figure 2:
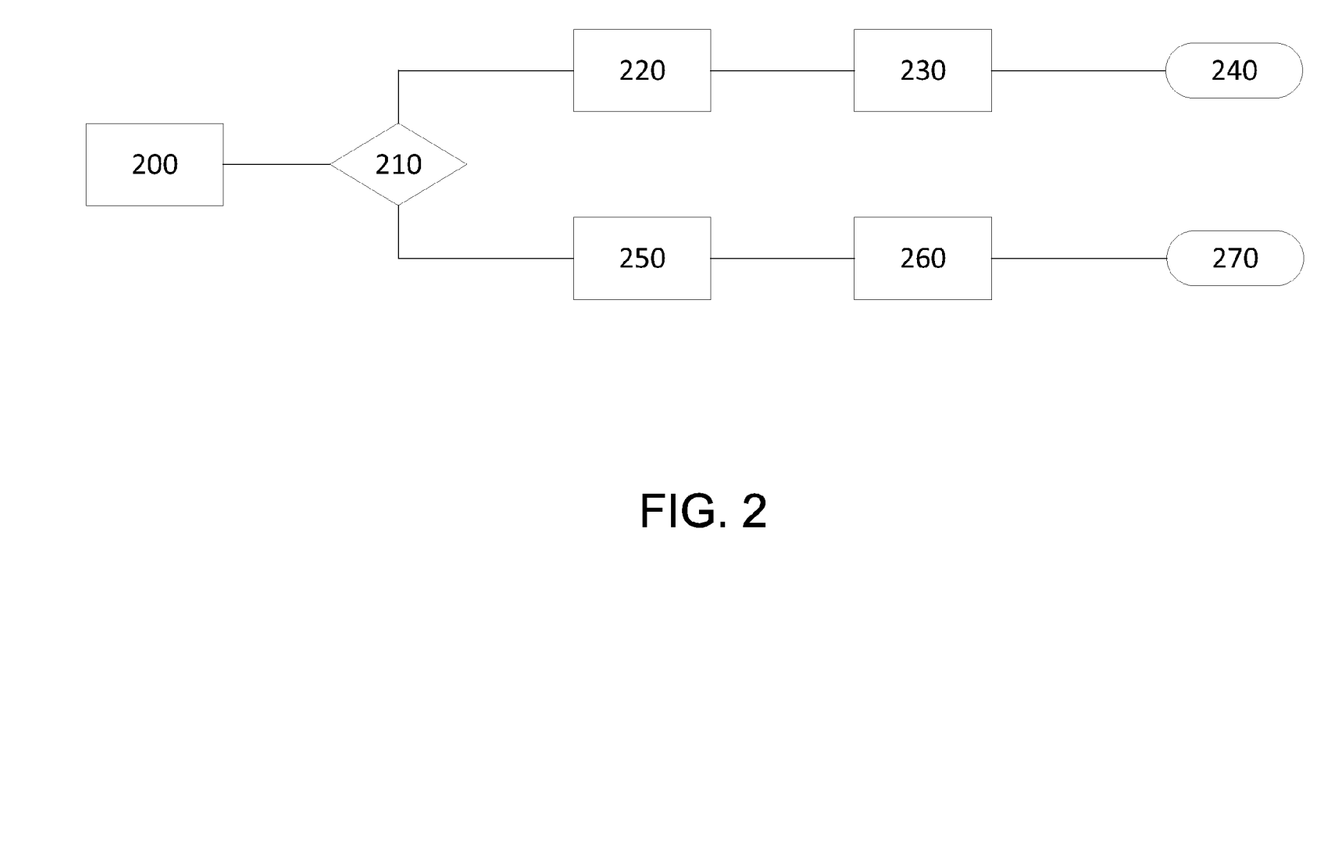
FIG. 2 illustrates an exemplary embodiment of a flowchart used to provide multiple VoIP service modes to a wireless device in a wireless network.

FIG. 2 illustrates an exemplary embodiment of a determination 210 of a mode for wireless transmission of a voice source 200 as a regular voice packet 250 or as a converted text packet 220, and subsequent receiving and either decoding 260, or converting 230, before playing at one of voice sink 240 or 270. At initial block 200, a voice call is initiated and a wireless device such as wireless device 102 establishes wireless communication with an access node such as access nodes 104 and/or 106. Related to determination 210 in the exemplary embodiment, wireless device 102 may monitor the instantaneous received signal level conditions of the serving access node(s) in a manner that may be based on network conditions or operator preferences.

At block 220, when the instantaneous received signal level of the serving access node(s) is below a signal level threshold, wireless device 102 may provide this information to the serving access node, and the wireless device may convert voice contained in the audio signal of the call into corresponding text of the words dictated. If the low signal level is between the receiving wireless device and its serving access node, conversion may take place at the either side's access node.

At block 230, text data packets which were transmitted wirelessly are received by a receiving access node or wireless device. Depending upon available resources, user defined preferences, or use of voice-recognition software such as neural networks, the received text data packets may be converted back to voice at the receiving access node or at the wireless device itself.

At block 240, the reconverted voice is played for a user of the receiving wireless device. Various modifications may be made to the voice based on analysis of vocal characteristics in order to make a playback voice as similar as possible to the actual voice of the original audio information.

If determination 210 results in a finding that the instantaneous signal level is above the threshold, then the wireless devices and access nodes may operate under normal conditions for the VoIP or VoLTE call. That is, a regular packet may be coded and transmitted at block 250 over the indicated wireless channel to a receiver at block 260 where it is decoded conventionally, then either further transmitted or played directly at a voice sink at block 270. It is noted that the voice sink indicated at block 240 may be the same voice sink indicated at block 270.

Figure 3:
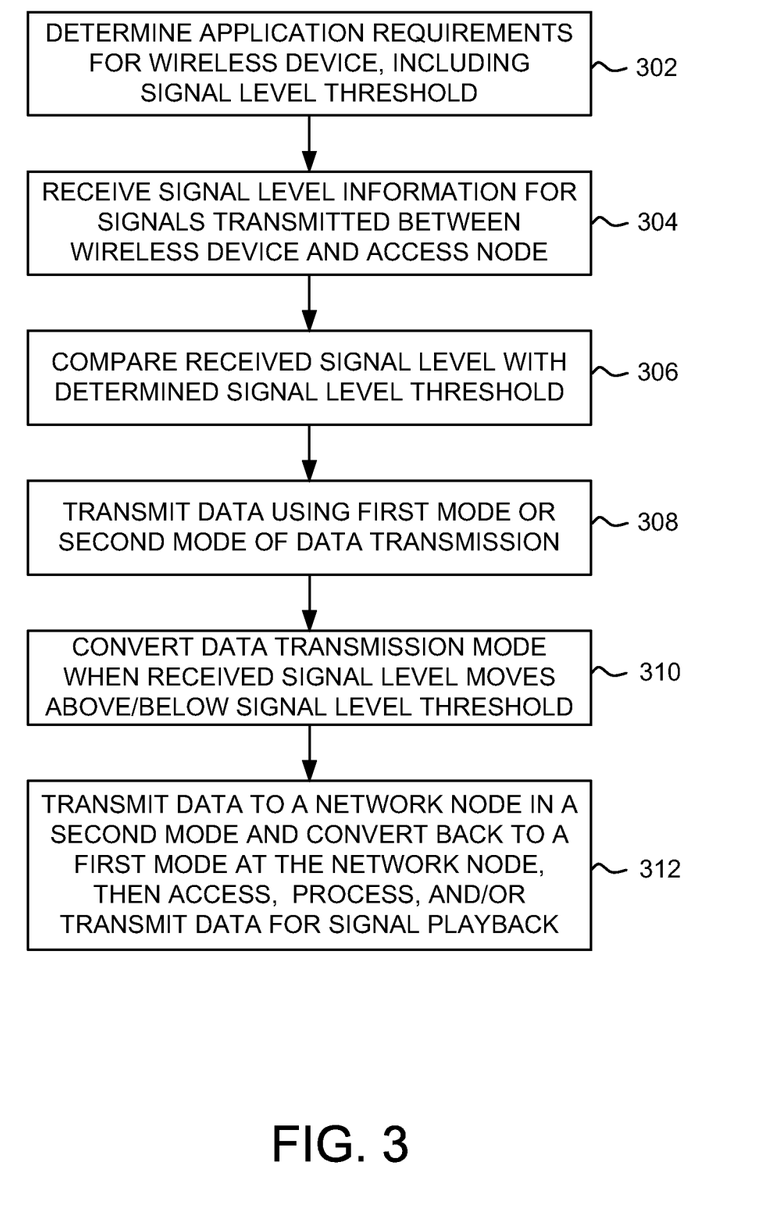
FIG. 3 illustrates an exemplary method of providing multiple VoIP service modes to a wireless device in a wireless network.

FIG. 3 illustrates an exemplary method for providing multiple voice service modes using transmission of data packets in a wireless network. The present disclosure refers to application requirements, which may comprise a quality of service, a type of service, or any other suitable metric for indicating what type of data and how many data packets the application may require. In an exemplary embodiment, application requirements may indicate a signal level threshold for initiating and maintaining a determined data rate.

Referring to FIG. 3, at step 302, application requirements are determined for a wireless device. The application requirements may include a signal level threshold for an application on the wireless device or in the network and accessed by the wireless device. The application requirements may be a type of service or a data rate required by the application. For example, the type of service may be voice, or the application may require a certain GBR. These exemplary embodiments of application requirements may indicate a signal level threshold for which an application can provide services demanded by the application without undesirable lapses in or loss of services.

At step 304, signal level information for signals transmitted between the wireless device and the access node may be received. Initially, signal measurements may be performed by the wireless device and then transmitted to the access node. The received signal level information may relate to any detected signal of the access node, and in an exemplary embodiment may comprise a system information signal received power (RSRP) or reference signal received quality (RSRQ) at the wireless device.

At step 306, the received signal level is compared with the determined signal level threshold. Using the type of signal determined previously, the comparison provides a finding as to whether the received signal level is greater than the determined signal level threshold, or whether it is equal to or less than the threshold.

At step 308, data transmission from the wireless device or the access node occurs using a first mode of data transmission when the received signal level is above the determined signal level threshold and using a second mode of data transmission when the received signal level is equal to or below the determined signal level threshold. The origin of the data transmission (wireless device, access node, or network node) is related to whether the wireless device is sending or receiving, the type of service, and the symmetry or asymmetry of the data transmission patterns over time.

If a wireless device is transmitting the data according to this exemplary embodiment, it will have to be capable of producing and transmitting data packets in both data transmission modes. However, an access mode transmitting to a wireless device that is below the signal level threshold may also need to be able produce and/or convert data packets in both modes, and transmit them to the wireless device.

At step 310, the mode of data transmission may be converted at any time it is determined that the received signal level changes relative position with respect to the signal level threshold. That is, in an exemplary embodiment, if the wireless device is transmitting in the second mode and the received signal level increases above the signal level threshold, the wireless device may convert to the first mode. Conversely, if the wireless device is transmitting in the first mode and the received signal level drops below the signal level threshold, the wireless device may convert back to the second mode.

Figure 4:
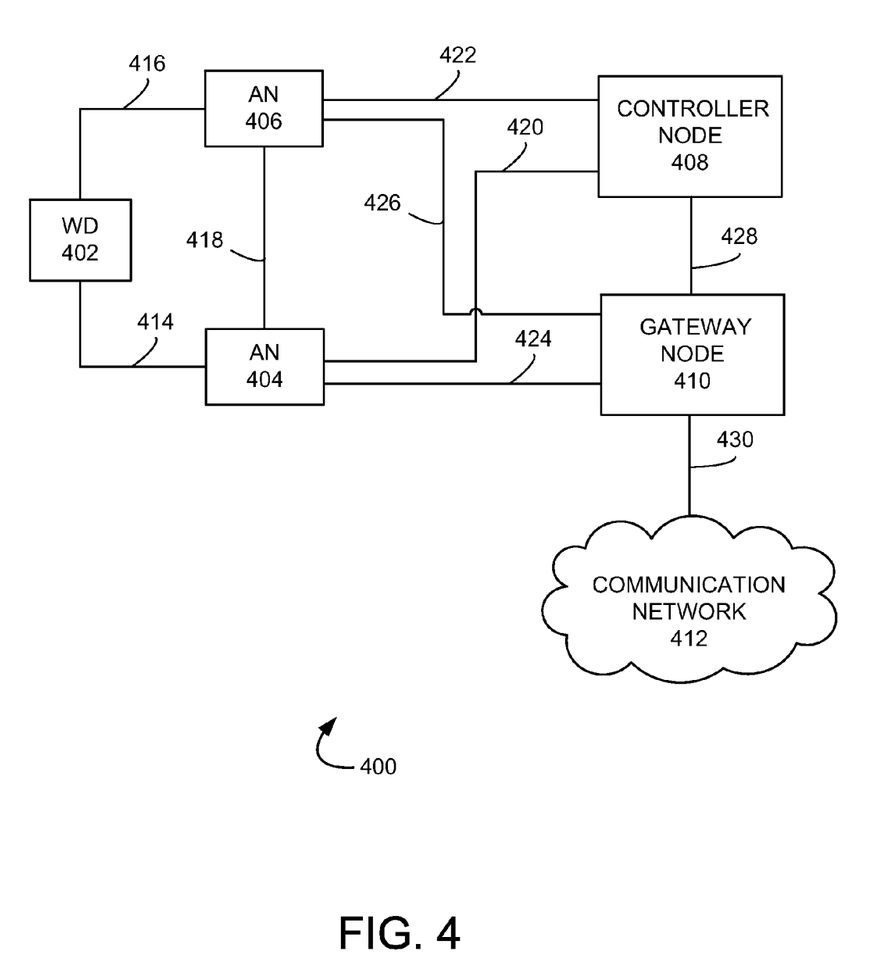
FIG. 4 illustrates another exemplary system used to provide multiple VoIP service modes to a wireless device in a wireless network.

At step 312, data in either the first mode or the second mode may be transmitted to a network node. The network node may be another wireless device with which the access node is in wireless communication, another access node, a gateway node, or a controller node. The network node FIG. 4 illustrates another exemplary communication system 400 that may be used to provide multiple VoIP service modes to a wireless device. Communication system 400 may comprise a wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, a NodeB device, or an enhanced NodeB (eNodeB) device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and combinations thereof. In an embodiment, controller node 408 may perform portions of the steps illustrated in the methods of FIGS. 3 and 5.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and combinations thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet).

Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX™). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX™), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5:
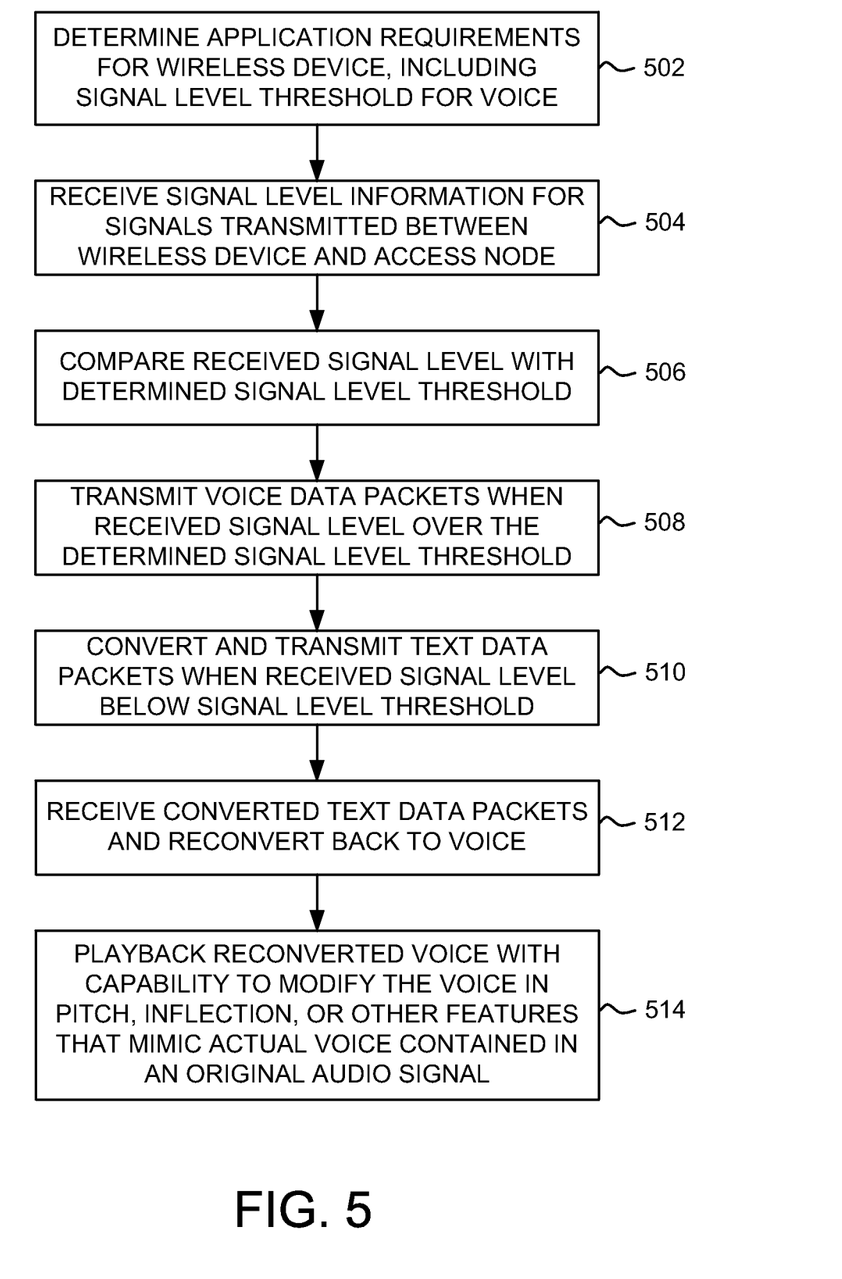
FIG. 5 illustrates another exemplary method of providing multiple VoIP service modes to a wireless device in a wireless network.

FIG. 5 illustrates an exemplary method for providing multiple VoIP service modes to a wireless device in a wireless network. The method will be discussed with reference to the exemplary communication system 400 illustrated in FIG. 4, however, the method can be implemented with any suitable communication system.

Referring to FIG. 5, at step 502, application requirements are determined for a wireless device such as wireless device 402. The application requirements may include a signal level threshold for an application on the wireless device or in the network 412 and accessed remotely by the wireless device 402. The application requirements may be a type of service or a data rate required by the application. For example, the type of service may be voice, or the application may require a certain GBR. These exemplary embodiments of application requirements may indicate a signal level threshold for which an application can provide services demanded by the application without undesirable lapses in or loss of services. The signal level threshold may relate to a point at which voice calls are determined to be more likely to lose packets or drop calls at a rate which is undesirable to the wireless device user or a network operator.

At step 504, signal level information for signals transmitted between the wireless device 402 and an access node, such as either of access nodes 404 or 406, may be received. Initially, signal measurements may be performed by the wireless device 402 and then transmitted to the access node(s) 404 and/or 406. The received signal level information may relate to any detected signal(s) of the access node(s) 404 and/or 406, and in an exemplary embodiment may comprise a system information signal received power (RSRP) or reference signal received quality (RSRQ) at the wireless device 402.

At step 506, the received signal level is compared with the determined signal level threshold. Using the type of signal determined previously, the comparison provides a finding as to whether the received signal level is greater than the determined signal level threshold, or whether it is equal to or less than the threshold.

At step 508, the wireless device 402 may transmit regular voice packets when it is determined that the received signal level from at least one of the access nodes 404 and 406 is above the determined signal level threshold. These regular voice packets may be coded, transmitted, and decoded in a conventional manner for audio playback.

At step 510, when it is determined that the received signal level from both access nodes 404 and 406 are equal to or below the determined signal level threshold, and these are the only access nodes in a coverage area, then a signal originally created from a voice source may be converted into text data packets and transmitted. Speech recognition software may be implemented on wireless device 402 and access nodes 404 and 406. In an exemplary embodiment, wireless device 402 and access nodes 404 and 406 may be capable of converting voice to text and vice versa prior to transmission or upon receipt of converted data packets.

At step 512, converted text data packets are received at a receiver, which may be wireless device 402 or either access node 404 or 406. The received text data packets may be reconverted into an audio signal representing the textual words spoken in a digitally produced voice.

At step 514, the audio signal containing a reconverted voice from the text data packets is played back at a destination. Various machine learning tools or user profiles may be used to modify playback voice in terms of pitch, inflection, or other audio features in order to mimic the actual voice contained in the original audio signal. Network nodes may use neural networks to communicate and learn audio features of different users over time, or users themselves may configure playback voice preferences.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
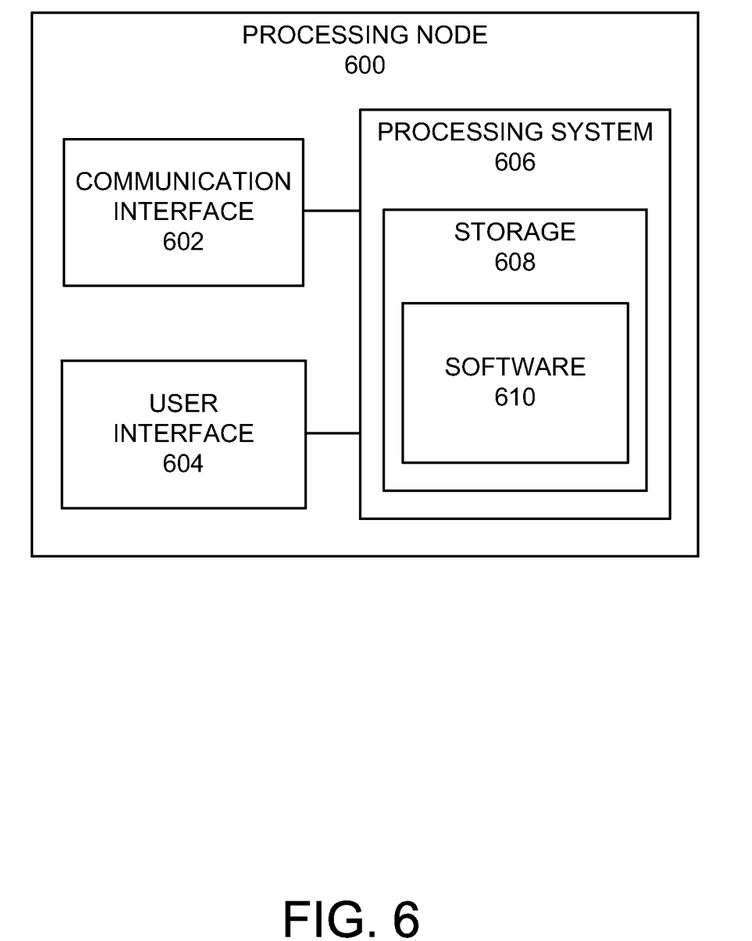
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 408 and gateway node 410. Processing node 600 can also be an adjunct or component of a network element, such as an element of access nodes 104, 106, 404, or 406. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for providing multiple voice over internet protocol (VoIP) service modes to a wireless device in a wireless network, the method comprising:

determining application requirements including a signal level threshold for the wireless device in wireless communication with an access node in the wireless network, the signal level threshold being based on a bit rate required by an application on the wireless device to operate in a first mode of data transmission;

receiving signal level information for signals transmitted between the access node and the wireless device;

comparing the received signal level information for the wireless device with the determined signal level threshold;

transmitting data between the wireless device and the access node using the first mode of data transmission when the received signal level exceeds the determined signal level threshold or a second mode of data transmission when the received signal level is equal to or less than the determined signal level threshold; and converting data transmission between the first mode of data transmission and the second mode of data transmission when the received signal level changes position with respect to the determined signal level threshold for the wireless device, wherein the first mode of data transmission is a voice packet transmission and the second mode of data transmission is a text data packet transmission.

2. The method of claim 1, wherein the text packet transmission is created from a voice source using speech recognition.

3. The method of claim 2, further comprising:
transmitting by the access node the data from the wireless device to one or more network nodes.

4. The method of claim 3, wherein the one or more network nodes comprises at least one of another wireless device with which the access node is in wireless communication, another access node, a gateway node, or a controller node.

5. The method of claim 4, further comprising:
receiving one or more text data packets in the second mode of transmission at the one or more network nodes and converting the text data packet transmission into a voice signal for audio playback at a destination.

6. The method of claim 5, further comprising:
determining audio characteristics of the voice source; and
utilizing neural networks to modify the voice signal for audio playback so that the audio playback of the converted text resembles the voice source in frequency, inflection, accent, or other determined audio characteristics of the voice source.

7. The method of claim 1, wherein converting data transmission further comprises manually selecting the first mode of data transmission or the second mode of data transmission by a user of the wireless device.

8. The method of claim 1, wherein converting data transmission further comprises receiving instructions to convert automatically from a first mode of data transmission to a second mode of data transmission based on received signal level information.

9. The method of claim 8, wherein automatically converting further comprises converting between modes of data transmission based on instantaneous received signal level information at any given time during a continuous VoIP call.

10. A system for providing multiple voice over internet protocol (VoIP) service modes to a wireless device in a wireless network, the system comprising:
a first access node in the wireless network; and
a processor coupled to the first access node, the processor for configuring the first access node to:
determine application requirements including a signal level threshold for the wireless device in wireless communication with the first access node, the signal level threshold being based on a bit rate required by an application on the wireless device to operate in a first mode of data transmission;

receive signal level information for signals transmitted between the first access node and the wireless device;

compare the received signal level information for the wireless device with the determined signal level threshold;

transmit data between to and from the wireless device using the first mode of data transmission when the received signal level exceeds the determined signal level threshold or a second mode of data transmission when the received signal level is equal to or less than the determined signal level threshold; and convert data transmission between the first mode of data transmission and the second mode of data transmission when the received signal level changes position with respect to the determined signal level threshold, wherein the first mode of data transmission is a voice packet transmission and the second mode of data transmission is a text data packet transmission.

11. The system of claim 10, wherein the first access node is further to instruct the wireless device to convert between the first mode of data transmission and the second mode of data transmission.

12. The system of claim 11, wherein a text packet transmission is created from a voice source using speech recognition.

13. The system of claim 12, wherein the first access node is further to transmit data from the wireless device to at least one network node.

14. The system of claim 13, wherein the at least one network node is at least one of another wireless device with which the first access node is in wireless communication, a second access node, a gateway node, or a controller node.

15. The system of claim 14, wherein the at least one network node is to:
receive one or more text data packets in the second mode of data transmission and convert the text data packet transmission into a voice signal for audio playback.

16. The system of claim 15, wherein the first access node or the at least one network node are configured to determine audio characteristics of the voice source and utilize neural networks to select a playback voice so that the audio playback of the converted text resembles the voice source in at least one of frequency, inflection, accent, or other determined audio characteristics of the voice source.

17. The system of claim 10, wherein the first access node is further to receive a user selection of a data transmission mode.

18. The system of claim 10, wherein the first access node and the wireless device are further to convert automatically between the first mode of data transmission and the second mode of data transmission based on received signal level information.

19. The system of claim 18, wherein the first access node is further to convert between modes of data transmission based on instantaneous received signal level information at any given time during a continuous VoIP call.

20. A method for providing multiple voice over IP (VoIP) service modes to a wireless device in a wireless network, the method comprising:
determining by an access node in the wireless network an instantaneous signal level threshold for a voice application used by the wireless device, wherein the wireless device is in wireless communication with the access node, and wherein the instantaneous signal level threshold is based on a bit rate required by the voice application to operate in a first mode of data transmission;

receiving instantaneous signal level information for signals transmitted between the access node and the wireless device;

comparing the instantaneous received signal level information for the wireless device with the determined instantaneous signal level threshold for the wireless device;

transmitting data between the wireless device and the access node using a first mode of data transmission when the instantaneous received signal level exceeds the determined instantaneous signal level threshold or a second mode of data transmission when the instantaneous received signal level is equal to or less than the determined instantaneous signal level threshold;

converting data transmission between the first mode of data transmission and the second mode of data transmission when the received signal level changes position with respect to the determined signal level threshold for the wireless device, wherein the first mode of data transmission is a voice data packet and the second mode of data transmission is a text data packet that is created from a voice source using speech recognition software on the wireless device or on the access node.

* * * * *